(12) United States Patent
Huh

(10) Patent No.: US 11,736,012 B2
(45) Date of Patent: Aug. 22, 2023

(54) DC-TO-DC VOLTAGE CONVERTER CIRCUIT WITH VOLTAGE CONVERSION METHOD USING SINGLE INDUCTOR

(71) Applicant: Samsung Electronics Co., Ltd., Suwon-si (KR)

(72) Inventor: Yeunhee Huh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 17/340,550

(22) Filed: Jun. 7, 2021

(65) Prior Publication Data
US 2022/0115947 A1  Apr. 14, 2022

(30) Foreign Application Priority Data
Oct. 13, 2020  (KR) .................. 10-2020-0131960

(51) Int. Cl.
*H02M 3/158* (2006.01)
*H02M 3/07* (2006.01)
*H02M 1/00* (2006.01)
*H02M 3/06* (2006.01)

(52) U.S. Cl.
CPC ......... *H02M 3/1582* (2013.01); *H02M 1/008* (2021.05); *H02M 1/009* (2021.05); *H02M 1/0095* (2021.05); *H02M 3/07* (2013.01); *H02M 3/06* (2013.01)

(58) Field of Classification Search
CPC .......... H02M 3/06; H02M 3/07; H02M 3/156; H02M 3/1582; H02M 1/008; H02M 1/009; H02M 1/0095
See application file for complete search history.

(56) References Cited

U.S. PATENT DOCUMENTS

| 7,256,568 B2 | 8/2007 | Lam et al. |
| 2005/0264271 A1 | 12/2005 | Lam et al. |
| 2014/0246908 A1* | 9/2014 | Chew ........................ H04Q 9/00 307/31 |

(Continued)

FOREIGN PATENT DOCUMENTS

| CN | 108432111 B | 5/2020 |
| KR | 10-1987238 B1 | 6/2019 |

(Continued)

OTHER PUBLICATIONS

Amin, et al. "MISIMO: A multi-input single-inductor multi-output energy harvesting platform in 28-nm FDSOI for powering net-zero-energy systems." *IEEE Journal of Solid-State Circuits* 53.12 (2018): 3407-3419. (13 pages in English).

(Continued)

*Primary Examiner* — Jue Zhang
(74) *Attorney, Agent, or Firm* — NSIP Law

(57) ABSTRACT

A voltage converter circuit includes a capacitor having a first end selectively connected to an input power source through a first input switch and a second end selectively connected to the input power source through a second input switch, and a single inductor configured to generate an output voltage in response to a voltage of a node between the single inductor and the first input switch, selectively connect the input power source through the first input switch at the node, and connect the first end of the capacitor at the node.

25 Claims, 14 Drawing Sheets

(56) References Cited

U.S. PATENT DOCUMENTS

2021/0234462 A1* 7/2021 Cannillo ............... H02M 3/158
2022/0329152 A1* 10/2022 Li ....................... H02M 3/1582

FOREIGN PATENT DOCUMENTS

KR   10-2019-0127250 A   11/2019
KR      10-2051570 B1   12/2019

OTHER PUBLICATIONS

Baek, et al. "11.7 a voltage-tolerant three-level buck-boost dc-dc converter with continuous transfer current and flying capacitor soil charger achieving 96.8% power efficiency and 0.87 μs/v dvs rate." *2020 IEEE International Solid-State Circuits Conference—(ISSCC)*. IEEE, 2020. (3 pages in English).

Abdulslam Abdullah, et al.: "A Simple Hybrid 3-level Buck-Boost DC-DC Converter with Efficient PWM Regulation Scheme", *2015 IEEE International Conference on Electronics, Circuits, and Systems (ICECS), IEEE*, Dec. 6, 2015, pp. 368-371 (4 pages in English).

Song Xiong, et al.: "Analysis of a High-Voltage-Gain Hybrid Switched-Capacitor Buck Converter", *2011 IEEE International Symposium of Circuits and Systems (ISCAS). IEEE*, May 15, 2011, pp. 1616-1619 (4 pages in English).

Extended European Search Report (EESR) dated Jan. 24, 2022, in counterpart European Application No. 21189357.3 (7 pages in English).

\* cited by examiner

DC-TO-DC VOLTAGE CONVERTER CIRCUIT WITH VOLTAGE CONVERSION METHOD USING SINGLE INDUCTOR

CROSS-REFERENCE TO RELATED APPLICATION

This application claims the benefit under 35 USC § 119(a) of Korean Patent Application No. 10-2020-0131960 filed on Oct. 13, 2020, in the Korean Intellectual Property Office, the entire disclosure of which is incorporated herein by reference for all purposes.

BACKGROUND

1. Field

The following description relates to direct current (DC)-to-DC voltage converter circuit with voltage conversion using a single inductor.

2. Description of Related Art

A direct current (DC)-to-DC converter is a converter configured to convert a voltage of a DC power source. A buck-boost converter is a converter capable of outputting voltages lower than or higher than an input voltage, regardless of the input voltage.

The buck-boost converter is used in general-purpose applications due to a relatively wide range of power conversion ratios. However, the power conversion efficiency of the buck-boost converter is low due to a great conduction loss and a great switching loss.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a voltage converter circuit includes a capacitor having a first end selectively connected to an input power source through a first input switch and a second end selectively connected to the input power source through a second input switch, and a single inductor configured to generate an output voltage in response to a voltage of a node between the single inductor and the first input switch, selectively connect the input power source through the first input switch at the node, and connect the first end of the capacitor at the node.

The capacitor and the single inductor may be always connected.

The capacitor and the single inductor may be directly connected without a switch.

When the voltage converter circuit is operating in a step-up mode, the single inductor may be further configured to generate the output voltage by alternately receiving a voltage in a first step-up power path including the capacitor, and a voltage in a second step-up power path including the first input switch.

In a step-up mode, the single inductor may be further configured to receive a voltage higher than an input voltage of the input power source from the capacitor at the node when the first input switch is open and the second input switch is closed.

In a step-up mode, the capacitor may be configured to transfer a voltage, obtained by adding a charging voltage used to charge the capacitor to an input voltage of the input power source, to the single inductor when the first input switch is open and the second input switch is closed.

In a step-up mode, the single inductor may be further configured to receive an input voltage of the input power source through the first input switch at the node when the first input switch is closed and the second input switch is open.

The voltage converter circuit may further include a capacitor switch configured to selectively connect the second end of the capacitor to the ground. In a step-up mode, the capacitor switch may be further configured to charge the capacitor using the input power source by connecting the second end of the capacitor to the ground when the first input switch is closed and the second input switch is open.

In a step-up mode, the voltage converter circuit may be configured to generate an output voltage with a voltage value within a range of voltages higher than or equal to an input voltage and lower than or equal to twice the input voltage.

The voltage converter circuit may further include a ground switch configured to selectively connect the single inductor to the ground at the node for a step-down mode. The voltage converter circuit may be configured to maintain an open state of the ground switch during a step-up mode and to maintain an open state of a capacitor switch and the second input switch during the step-down mode.

When the voltage converter circuit is operating in the step-down mode, the single inductor may be further configured to generate the output voltage by alternately receiving a voltage in a first step-down power path including the first input switch and a voltage in a second step-down power path including the ground switch.

In the step-down mode, the single inductor may be further configured to receive an input voltage of the input power source at the node when the first input switch is closed and the ground switch is open.

In the step-down mode, the single inductor may be further configured to receive a ground voltage at the node when the first input switch is open and the ground switch is closed.

In a step-up mode, the single inductor may be further configured to output a load current with the same waveform as a waveform of an inductor current flowing in the single inductor in a first time interval in which the inductor current is ramped up and a second time interval in which the inductor current is ramped down.

The voltage converter circuit may further include a plurality of output terminals connected to the single inductor. The voltage converter circuit may be configured to select one of the output terminals, and supply the output voltage generated by the single inductor to the selected output terminal.

The voltage converter circuit may further include a plurality of first input switches configured to selectively respectively connect each of a plurality of input power sources to the first end of the capacitor, and a plurality of second input switches configured to selectively respectively connect each of the plurality of input power sources to the second end of the capacitor.

The voltage converter circuit may further include at least one additional capacitor configured to establish one of a parallel connection with the capacitor and a series connection with the capacitor through a plurality of additional switches. The voltage converter circuit may be configured to charge the capacitor and the at least one additional capacitor that are connected in parallel during a second time interval of a step-up mode, using the input power source. The voltage converter circuit may be configured to add an input voltage of the input power source and charging voltages used to charge the capacitor and the at least one additional capacitor that are connected in series during a first time interval, and configured to transfer a voltage, obtained by adding the charging voltages and the input voltage, to the single inductor.

The voltage converter circuit may further include a switching controller configured to adjust a duty ratio for the first input switch and the second input switch based on a set target voltage and the output voltage.

Each of a plurality of first input switches may be configured to selectively connect an external power source terminal and a battery power source terminal to the first end of the capacitor. Each of a plurality of second input switches may be configured to selectively connect the external power source terminal and the battery power source terminal to the second end of the capacitor. The single inductor may be selectively connected to one of the battery power source terminal, a first output terminal and a second output terminal.

In another general aspect, a voltage conversion method including during a first time interval of a step-up mode, turning off a first input switch between an input power source and an inductor and turning on a second input switch between the input power source and a capacitor, generating, during the first time interval, an output voltage by transferring an input voltage of the input power source and a charging voltage used to charge the capacitor through the second input switch to the single inductor, turning on the first input switch and turning off the second input switch during a second time interval of the step-up mode, and charging the capacitor, transferring the input voltage to the single inductor and generating an output voltage during the second time interval.

In another general aspect, a voltage converter circuit includes a capacitor and an inductor. The capacitor has a first end selectively connected to each of input power sources through corresponding ones of first input switches, and a second end selectively connected to the input power sources through corresponding ones of second input switches. The inductor is configured to generate output voltages in response to a voltage of a node between the inductor and the first input switches, selectively connect the input power sources through corresponding ones of the first input switches at the node, and connect the first end of the capacitor at the node.

The capacitor and the inductor may be directly connected.

When the voltage converter circuit is operating in a step-up mode, the inductor may be further configured to generate the output voltages by alternately receiving each of voltages in first step-up power paths including the capacitor, and voltages in second step-up power paths including the first input switch.

In a step-up mode, the single inductor may be further configured to receive a voltage higher than an input voltage of a corresponding one of the input power sources from the capacitor at the node when a corresponding one of the first input switches is open and a corresponding one of the second input switches is closed.

In a step-up mode, the capacitor may be configured to transfer a voltage, obtained by adding a charging voltage used to charge the capacitor to an input voltage of one of the input power sources, to the inductor when a corresponding one the first input switches is open and a corresponding one of the second input switch is closed.

In a step-up mode, the inductor may be further configured to receive an input voltage of of the input power sources through a corresponding one of the first input switches at the node when a corresponding one of the first input switches is closed and a corresponding one of the second input switches is open.

The voltage converter circuit may further includes a capacitor switch configured to selectively connect the second end of the capacitor to the ground. In a step-up mode, the capacitor switch may be further configured to charge the capacitor using one of the input power sources by connecting the second end of the capacitor to the ground when the first input switch is closed and the second input switch is open.

The voltage converter circuit may further include a ground switch configured to selectively connect the single inductor to the ground at the node for a step-down mode. The voltage converter circuit may be configured to maintain an open state of the ground switch during a step-up mode, and an open state of a capacitor switch and the second input switches during the step-down mode.

Other features and aspects will be apparent from the following detailed description, the drawings, and the claims.

Figure 1:
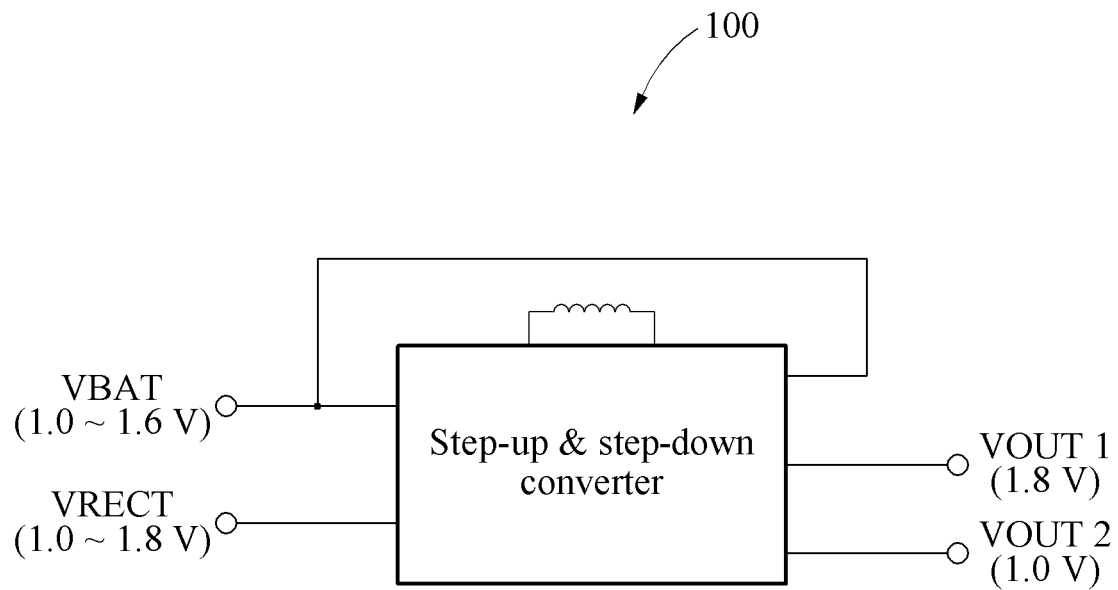
FIG. 1 illustrates an example of a step-up and step-down converter.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a step-up and step-down converter.

A voltage converter circuit 100 is a circuit to convert a voltage and may include a direct current (DC)-to-DC converter circuit. A DC-to-DC converter circuit may be used in various apparatuses in which a DC voltage needs to be regulated. The DC-to-DC converter circuit may be a circuit to convert an input DC voltage into a DC voltage and output the DC voltage. In the following description, a DC-to-DC converter circuit will be described as a voltage converter circuit. The DC-to-DC converter circuit may be expressed as a DC/DC converter, a DC-DC converter, and a DC transformer. The voltage converter circuit 100 may be referred to as a "voltage converter 100." Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The voltage converter 100 may be a step-up and step-down converter capable of performing both a step-up operation and a step-down operation. The step-down operation may be an operation of outputting an electric signal with a voltage lower than or equal to an input voltage. The step-up operation may be an operation of outputting an electric signal with a voltage higher than or equal to an input voltage. For example, when the voltage converter 100 is a DC-to-DC converter circuit, the voltage converter 100 may receive a DC input and generate a DC output.

As shown in FIG. 1, the voltage converter 100 may be connected to a battery voltage terminal VBAT and an external power source terminal VRECT at an input side. The battery voltage terminal VBAT may be a terminal configured to receive power from an electronic device, including the voltage converter 100 and/or a battery mounted in the electric device. The external power source terminal VRECT may be a terminal configured to receive power from an external device. The electronic device may be, for example, a device that may operate by receiving power wirelessly or via a wire from an external device or operate using the power of a battery included in the device. The voltage converter 100 may be connected to the battery voltage terminal VBAT, a first output terminal VOUT1, and a second output terminal VOUT2 at an output side. The voltage converter 100 may selectively output a voltage required by an electronic device during an operation of the electronic device. In an example, the voltage converter 100 may generate an output voltage using one of the first output terminal VOUT1 and the second output terminal VOUT2 to operate other modules, elements, and circuits in the electronic device. In another example, the voltage converter 100 may generate an output voltage through the battery voltage terminal VBAT and may charge the battery included in the electronic device.

The above-described electronic device may be an implantable apparatus, configured to charge a battery included in the electronic device using external power, operating by selectively using the external power and power of the battery. The implantable apparatus may operate and charge a battery by wirelessly receiving power outside a living body. When wireless power reception is less than desirable, the implantable apparatus may operate using the power of a battery included in the implantable apparatus.

In FIG. 1, the voltage converter 100 may receive a voltage of 1.0 volts (V) to 1.6 V through the battery voltage terminal VBAT of the electronic device. The voltage converter 100 may receive a voltage of 1.0 V to 1.8 V through the electronic device's external power source terminal VRECT. The battery voltage terminal VBAT and the external power source terminal VRECT may receive DC voltages. The first output terminal VOUT1 may be a terminal configured to output a DC voltage of 1.8 V. The second output terminal VOUT2 may be a terminal configured to output a DC voltage of 1.0 V. The above-described battery voltage terminal VBAT may be connected as an output terminal. The voltage converter 100 may need to perform a step-up operation to output the voltage received through the battery voltage terminal VBAT to the first output terminal VOUT1. The voltage converter 100 may also need to perform a step-down operation to output the voltage received through the external power source terminal VRECT to the second output terminal VOUT2. The voltage converter circuit 100 may also be included in a power management integrated circuit (PMIC).

Since a buck-boost circuit has a relatively low power efficiency due to discontinuous output current, a voltage converter circuit capable of performing a step-up operation and a step-down operation while maintaining a high power efficiency by continuously providing output current will be described below. In an example, when an electronic device, for example, a mobile device, requiring multiple inputs and outputs includes a plurality of PMICs for multiple inputs and outputs, each of the PMICs may need to include an inductor individually. However, since the volume of the inductor is greater than those of other elements, the total volume of the electronic device may increase. An example of a voltage converter that may be implemented in a smaller size that may enable multiple inputs and outputs and perform a step-up operation and a step-down operation will be further described below.

Figure 2:
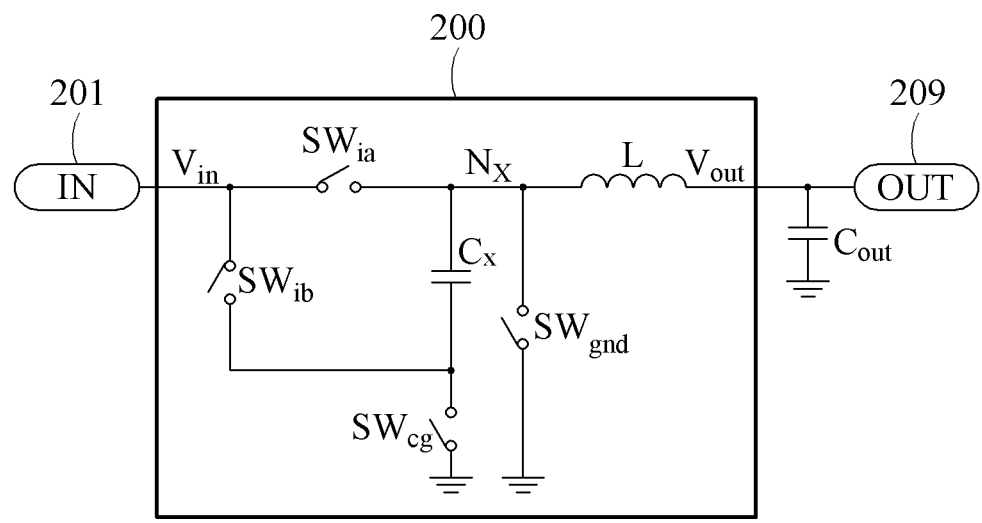
FIG. 2 illustrates an example of a voltage converter circuit.

FIG. 2 illustrates an example of a voltage converter circuit 200.

The voltage converter circuit 200 may include a plurality of switches, a capacitor $C_x$, and a single inductor L. A terminal on an input side of the voltage converter circuit 200 and a terminal on an output side of the voltage converter circuit 200 may be referred to as an input terminal 201 and an output terminal 209, respectively. FIG. 2 shows one input terminal 201 and one output terminal 209 for the convenience of description; however, examples are not limited thereto. For example, the voltage converter circuit 200 may include a plurality of terminals, described with reference to FIGS. 10 and 11.

The input terminal 201 may be a terminal connected to an input power source. The input terminal 201 may be connected to a first input switch $SW_{ia}$ and a second input switch $SW_{ib}$. A voltage of the input terminal 201 may be referred to as an "input voltage."

The first input switch $SW_{ia}$ may be a switch configured to selectively connect the input terminal 201 to the capacitor $C_x$ and the single inductor L. The first input switch $SW_{ia}$ may connect or disconnect the input terminal 201 to or from a first end of the capacitor $C_x$ and the single inductor L for each of the time intervals of each of a step-up mode and a step-down mode.

The second input switch $SW_{ib}$ may be a switch configured to selectively connect the input terminal 201 to a second end of the capacitor $C_x$. The second input switch $SW_{ib}$ may connect or disconnect the input terminal 201 to or from the second end of the capacitor $C_x$ for each time interval of the step-up mode. The second input switch $SW_{ib}$ may maintain an open state in the step-down mode.

Although one first input switch $SW_{ia}$ and one second input switch $SW_{ib}$ are shown in FIG. 2, examples are not limited thereto. For example, a number of first input switches $SW_{ia}$ and a number of second input switches $SW_{ib}$ may correspond to a number of input terminals 201. A plurality of first input switches and a plurality of second input switches will be further described with reference to FIG. 11.

The capacitor $C_x$ may have the first end selectively connected to the input power source through the first input switch $SW_{ia}$, and the second end selectively connected to the input power source through the second input switch $SW_{ib}$. The second end of the capacitor $C_x$ may be selectively connected to the ground through a capacitor switch $SW_{cg}$. The first end of the capacitor $C_x$ may be connected to the first input switch $SW_{ia}$, the single inductor L, and a ground switch $SW_{gnd}$ at a node $N_x$. The second end of the capacitor $C_x$ may be connected to the second input switch $SW_{ib}$ and the capacitor switch $SW_{cg}$.

The capacitor switch $SW_{cg}$ may be a switch configured to selectively connect the second end of the capacitor $C_x$ to the ground. The capacitor switch $SW_{cg}$ may be used to charge the capacitor $C_x$. The capacitor switch $SW_{cg}$ may connect or disconnect the second end of the capacitor $C_x$ to or from a ground terminal for each time interval of the step-up mode. The capacitor switch $SW_{cg}$ may maintain an open state in the step-down mode.

The single inductor L may be selectively connected to the input power source through the first input switch $SW_{ia}$ at the node $N_x$. The node may be a node $N_x$ on an input side of the single inductor L and may be connected to the first input switch $SW_{ia}$, the capacitor $C_x$, the ground switch $SW_{gnd}$, and the single inductor L. A voltage of the node $N_x$ may be represented as a node voltage $V_x$. The single inductor L may be connected to the first end of the capacitor $C_x$ at the node $N_x$. The single inductor L may be selectively connected to the ground through the ground switch $SW_{gnd}$ at the node $N_x$. The input side of the single inductor L may be connected to the node $N_x$, and an output side of the single inductor L may be connected to the output terminal 209. The single inductor L may generate an output voltage in response to the voltage of the node $N_x$.

The ground switch $SW_{gnd}$ may be connected between the first end of the capacitor $C_x$, the first input switch $SW_{ia}$, the single inductor L, and the ground terminal at the node $N_x$. The ground switch $SW_{gnd}$ may connect or disconnect the node $N_x$ to or from the ground terminal for each time interval of the step-down mode. The ground switch $SW_{gnd}$ may maintain an open state in the step-up mode.

The capacitor $C_x$ and the single inductor L may be connected at all times regardless of each mode's mode and time intervals. For example, as shown in FIG. 2, the capacitor $C_x$ and the single inductor L may be directly connected instead of using a switch. Since the capacitor $C_x$ and the single inductor L are connected at all times in the voltage converter circuit 200, a load current of an output signal output through the output terminal 209 is continuous. Thus, the voltage converter circuit 200 may have an enhanced power conversion efficiency. The voltage converter circuit 200 may cover a voltage conversion ratio M ranging between "0" and "2" inclusive, used in most practical applications, which will be described below.

Hereinafter, the step-down mode and the step-up mode of the voltage converter circuit 200 of FIG. 2 will be described with reference to FIGS. 3 and 4, respectively.

Figure 3:
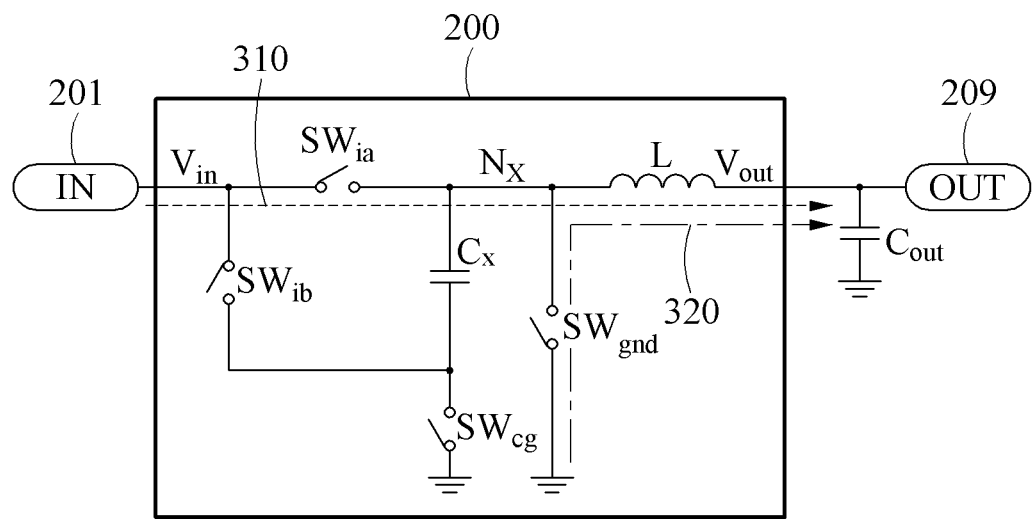
FIG. 3 illustrates an example of an operation of a voltage converter circuit in a step-down mode.

FIG. 3 illustrates an example of an operation of the voltage converter circuit 200 in the step-down mode.

The voltage converter circuit 200 may operate in the step-down mode. Each cycle of the step-down mode may be divided into a plurality of time intervals. A cycle may also be referred to as a period. The voltage converter circuit 200 may turn on or off at least a portion of a plurality of switches for each of the plurality of time intervals. An example of a configuration of a continuous current mode (CCM) will be described below.

The voltage converter circuit 200 may activate a first step-down power path 310 during a first time interval of the step-down mode, and may activate a second step-down power path 320 during a second time interval of the step-down mode. The first time interval may be a ramp-up interval in which an inductor current flowing in the single inductor L increases. The second time interval may be a ramp-down interval in which the inductor current decreases. As described above, for the step-down mode, the voltage converter circuit 200 may include the ground switch $SW_{gnd}$ configured to selectively connect the single inductor L to the ground at the node $N_x$. The voltage converter circuit 200 may also maintain an open state of each of the second input switch $SW_{ib}$ and the capacitor switch $SW_{cg}$ during the step-down mode.

The voltage converter circuit 200 may turn on the first input switch $SW_{ia}$ and turn off the ground switch $SW_{gnd}$ during the first time interval of the step-down mode. The first input switch $SW_{ia}$ may connect the input terminal 201 to the single inductor L, and the ground switch $SW_{gnd}$ may disconnect the ground terminal from the single inductor L. The single inductor L may receive an input voltage $V_{in}$ of the input power source at the node $N_x$ while the first input switch $SW_{ia}$ is closed and the ground switch $SW_{gnd}$ is open in the step-down mode. The node voltage Vx of the node Nx may increase to the input voltage Vin by the above-described switching. By increasing the node voltage $V_x$ of the node $N_x$, the inductor current of the single inductor L may be ramped up.

The voltage converter circuit 200 may turn off the first input switch $SW_{ia}$ and turn on the ground switch $SW_{gnd}$ during the second time interval of the step-down mode. The first input switch $SW_{ia}$ may disconnect the input terminal 201 from the single inductor L, and the ground switch $SW_{gnd}$ may connect the ground terminal to the single inductor L. The single inductor L may receive a ground voltage at the node $N_x$ while the first input switch $SW_{ia}$ is open and the ground switch $SW_{gnd}$ is closed in the step-down mode. By the above-described switching, the node voltage $V_x$ of the node $N_x$ may drop to the ground voltage, for example, 0 V. By a drop of the node voltage $V_x$ of the node $N_x$, the inductor current may be ramped down. An output capacitor $C_{out}$ may also be connected to the output terminal 209, so that the single inductor L and the output capacitor $C_{out}$ may form an LC circuit. Thus, the inductor current may gradually decrease.

Thus, during the step-down mode, the single inductor L may generate an output voltage $V_{out}$ by alternately receiving a voltage on the first step-down power path 310, including the first input switch $SW_{ia}$ and a voltage on a second step-down power path 320, including the ground switch $SW_{gnd}$, at the node $N_x$. The voltage converter circuit 200 may generate the output voltage $V_{out}$ with a voltage value within a range of voltages higher than or equal to 0 V and lower than or equal to the input voltage during the step-down mode. The output voltage $V_{out}$ may be determined based on a duty ratio. The voltage converter circuit 200 operating in the step-down mode may have a conversion ratio ranging between "0" and "1" inclusive, based on the duty ratio. The duty ratio may be determined based on the first time interval and the second time interval. For example, the duty ratio may be defined as "D=(first time interval/(first time interval+second time interval))." A switching controller 1350 of FIG. 13 may adjust the output voltage $V_{out}$ by adjusting the duty ratio, further described below.

The voltage converter circuit 200 configured with the CCM may seamlessly continue to supply a load current during the first time interval and the second time interval.

Figure 4:
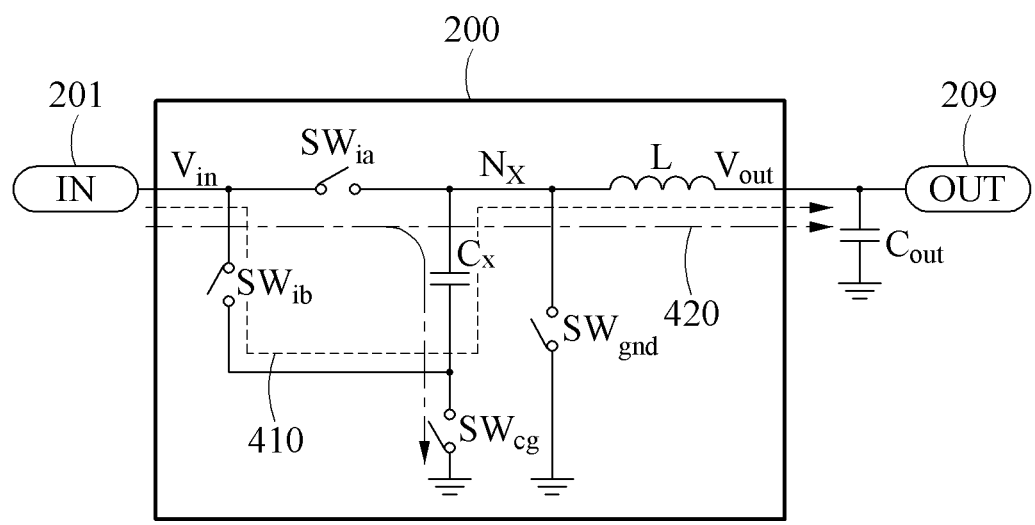
FIG. 4 illustrates an example of an operation of a voltage converter circuit in a step-up mode.

FIG. 4 illustrates an example of an operation of the voltage converter circuit 200 in the step-up mode.

The voltage converter circuit 200 may operate in the step-up mode. Similarly to the above-described step-down mode, each cycle of the step-up mode may also be divided into a plurality of time intervals. The voltage converter circuit 200 may turn on or off, at least, a portion of a plurality of switches for each of the plurality of time intervals. An example of a configuration of a CCM is also described with reference to FIG. 4.

The voltage converter circuit 200 may activate a first step-up power path 410 during a first time interval of the step-up mode and activate a second step-up power path 420 during a second time interval of the step-up mode. The first time interval may be a ramp-up interval in which the inductor current flowing in the single inductor L increases. The second time interval may be a ramp-down interval in which the inductor current decreases. As described above, the voltage converter circuit 200 may include the capacitor switch $SW_{cg}$ configured to selectively connect the second end of the capacitor $C_x$ to the ground. The voltage converter circuit 200 may maintain an open state of the ground switch $SW_{gnd}$ during the step-up mode.

Prior to initiating an initial operation of the step-up mode, the voltage converter circuit 200 may turn on the first input switch $SW_{ia}$ and the capacitor switch $SW_{cg}$, and turn off the second input switch $SW_{ib}$. The voltage converter circuit 200 may charge the capacitor $C_x$ with the input voltage $V_{in}$. Subsequently, the voltage converter circuit 200 may initiate the step-up mode.

During the first time interval of the step-up mode, the voltage converter circuit 200 may turn on the second input switch $SW_{ib}$ and turn off the first input switch $SW_{ia}$ and the capacitor switch $SW_{cg}$. The second input switch $SW_{ib}$ may connect the input terminal 201 to the second end of the capacitor $C_x$. The first input switch $SW_{ia}$ and the capacitor switch $SW_{cg}$ may disconnect the capacitor $C_x$ from the input terminal 201 and the ground, respectively. The single inductor L may receive a voltage higher than the input voltage $V_{in}$ of the input power source from the capacitor $C_x$ at the node $N_x$ while the first input switch $SW_{ia}$ is open and the second input switch $SW_{ib}$ is closed in the step-up mode. By the above-described switching, the capacitor $C_x$ may transfer a voltage, obtained by adding a charging voltage $V_{cx}$ used to charge the capacitor $C_x$ to the input voltage $V_{in}$ of the input power source, to the single inductor L while the first input switch $SW_{ia}$ is open and the second input switch $SW_{ib}$ is closed in the step-up mode. The charging voltage $V_{cx}$ may be added to the input voltage and the charging voltage $V_{cx}$ and the input voltage $V_{in}$ may be equal in the example of FIG. 4, and accordingly, the node voltage $V_x$ of the node $N_x$ may increase up to 2 $V_{in}$. By increasing the node voltage $V_x$ of the node $N_x$, the inductor current may be ramped up.

During the second time interval of the step-up mode, the voltage converter circuit 200 may turn on the first input switch $SW_{ia}$ and the capacitor switch $SW_{cg}$, and may turn off the second input switch $SW_{ib}$. The first input switch $SW_{ia}$ may connect the input terminal 201 to the first end of the capacitor $C_x$ and the single inductor L. The capacitor switch $SW_{cg}$ may connect the second end of the capacitor $C_x$ to the ground. The single inductor L may receive the input voltage $V_{in}$ of the input power source through the first input switch $SW_{ia}$ at the node $N_x$ while the first input switch $SW_{ia}$ is closed and the second input switch $SW_{ib}$ is open in the step-up mode. The node voltage Vx of the node Nx may drop to the input voltage Vin by the above-described switching. By a drop of the node voltage $V_x$ of the node $N_x$, the inductor current of the single inductor L may be ramped down. Also, while the first input switch $SW_{ia}$ is closed and the second input switch $SW_{ib}$ is open in the step-up mode, the capacitor switch $SW_{cg}$ may connect the second end of the capacitor $C_x$ to the ground, so that the capacitor $C_x$ may be charged using the input power source. In an example, the voltage converter circuit 200 may simultaneously charge the capacitor $C_x$ with the input voltage $V_{in}$ in the second time interval. In this example, when the capacitor $C_x$ is not extremely small in size, a charge balance of the capacitor $C_x$ may remain unchanged, instead of excessively changing.

Accordingly, the single inductor L may generate an output voltage by alternately receiving a voltage on the first step-up power path 410, including the capacitor $C_x$, and a voltage on the second step-up power path 420, including the first input switch $SW_{ia}$ during the step-up mode. As described above, the voltage converter circuit 200 may increase the node voltage $V_x$ of the node $N_x$ to be higher than the input voltage $V_{in}$ using the charging voltage of the capacitor $C_x$ during the first time interval, to generate an output voltage $V_{out}$ higher than the input voltage $V_{in}$. The voltage converter circuit 200 may generate an output voltage $V_{out}$ with a voltage value higher than or equal to the input voltage $V_{in}$ during the step-up mode. The voltage converter circuit 200 of FIG. 4 may generate an output voltage $V_{out}$ with a voltage value within a range of voltages higher than or equal to the input voltage $V_{in}$ and lower than or equal to two times the input voltage $V_{in}$ during the step-up mode. The output voltage $V_{out}$ may be determined based on the duty ratio. The voltage converter circuit 200 operating in the step-up mod may have a conversion ratio ranging between "1" and "2" inclusive, based on the duty ratio. The duty ratio may be determined based on the first time interval and the second time interval. For example, the duty ratio may be defined as "D=(first time interval/(first time interval+second time interval))." The switching controller 1350 of FIG. 13 may adjust the output voltage $V_{out}$ by adjusting the duty ratio, as further described below.

As described above, the voltage converter circuit 200 may have the conversion ratio ranging between "0" and "1" inclusive in the step-down mode, and may have the conversion ratio ranging between "1" and "2" inclusive in the step-up mode. Accordingly, the voltage converter circuit 200 may finally have a conversion ratio ranging between "0" and "2" inclusive. Also, the voltage converter circuit 200 may seamlessly continue to supply a load current within a range of the conversion ratio between "0" and "2" inclusive. The voltage converter circuit 200 may have an effect enhanced in terms of an output voltage ripple and a load transient, described with reference to FIGS. 5A and 5B.

Figure 5A:
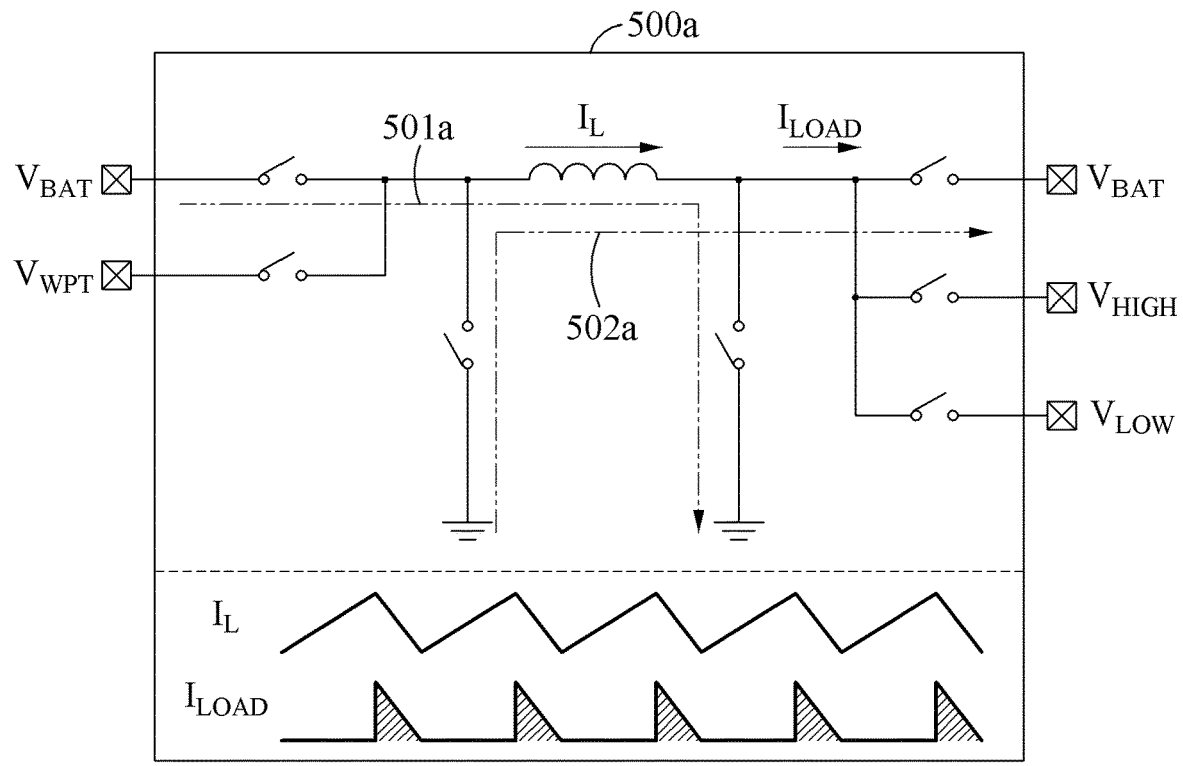
FIG. 5A illustrates a buck-boost circuit according to a related art and a current waveform of the buck-boost circuit.
Figure 5B:
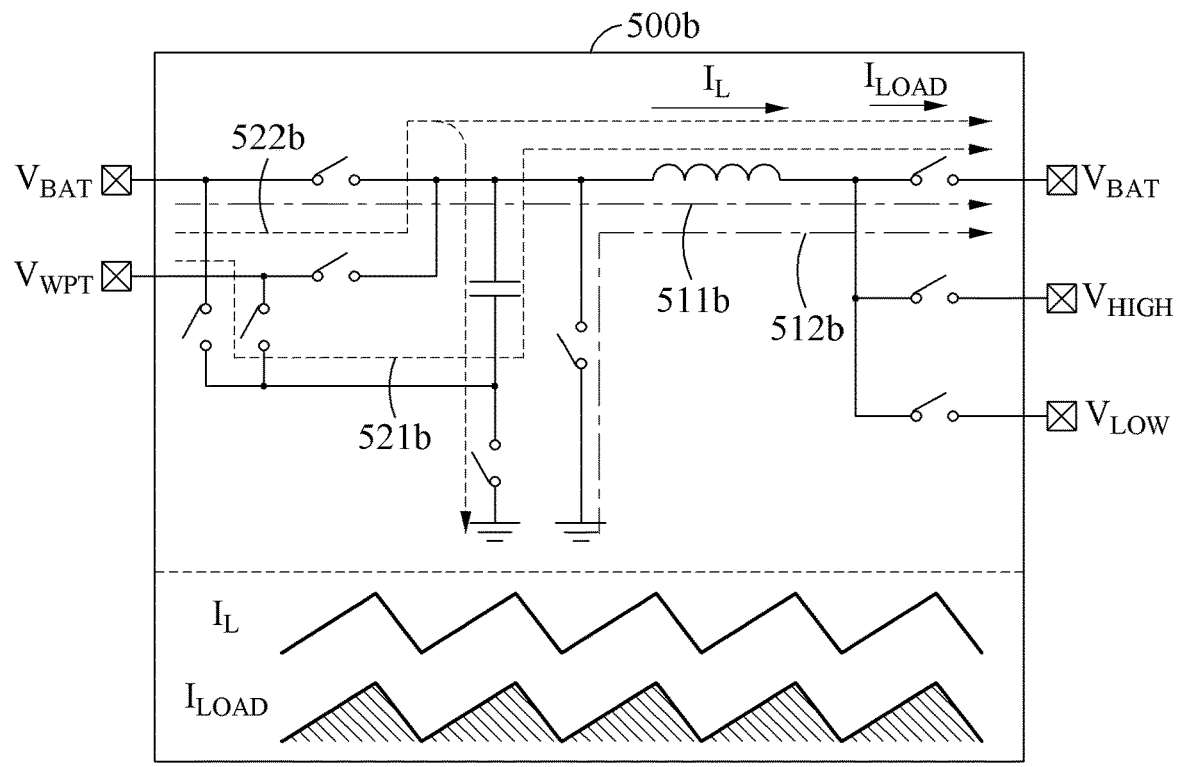
FIG. 5B illustrates an example of a voltage converter circuit and a current waveform of the voltage converter circuit.

FIGS. 5A and 5B illustrate waveforms of load currents due to a difference in a structure between voltage converter circuits.

FIG. 5A illustrates a buck-boost circuit 500a according to a related art and a current waveform of the buck-boost circuit 500a. FIG. 5B illustrates an example of a voltage converter circuit 500b and a current waveform of the voltage converter circuit 500b.

In the voltage converter circuit 500b of FIG. 5B, each of a plurality of first input switches may selectively connect an external power source terminal $V_{WPT}$ and a battery power source terminal $V_{BAT}$ to a first end of a capacitor. Each of a plurality of second input switches may selectively connect the external power source terminal $V_{WPT}$ and the battery power source terminal $V_{BAT}$ to a second end of the capacitor. A single inductor may be selectively connected to one of a battery power source terminal $V_{BAT}$, a first output terminal $V_{HIGH}$, and a second output terminal $V_{LOW}$.

In FIG. 5A, the buck-boost circuit 500a may generate an output by alternately activating a first path 501a and a second path 502a. However, the buck-boost circuit 500a needs to turn on an output switch every time the first path 501a and the second path 502a are alternately activated, even though power is supplied to the same output terminal.

On the contrary, the voltage converter circuit 500b may not need to switch an output switch for a corresponding output terminal, when a first step-down power path 511b, a second step-down power path 512b, a first a step-up power path 521b, and a second step-up power path 522b are switched, while power continues to be supplied to the same output terminal without changing the output terminal. Thus, the voltage converter circuit 500b may have a low switching loss compared to a typical buck-boost circuit, for example, buck-boost circuit 500a.

Also, the voltage converter circuit 500b may have the single inductor and the capacitor that are connected at all times, as described above. Since an output side of the inductor is continuously connected to an output terminal, a current may continue to be supplied to a load. In other words, the voltage converter circuit 500b may continue to supply a continuous load current to the load on the output side in both a step-down mode and a step-up mode. The voltage converter circuit 500b may provide an output current of root mean square (RMS) reduced due to continuous current supply. Accordingly, a conduction loss in a parasitic resistance, for example, a DC resistance (DCR) of the inductor or an ON resistance of a switch, may be reduced. Also, a ripple component of an output voltage of the voltage converter circuit 500b may be reduced. Thus, the size requirement of the capacitor on the output side may be relatively reduced. In addition, a positive zero having a bad influence on a bandwidth of a controller loop may be removed, and accordingly, a relatively fast load transient response may be possible.

The single inductor of the voltage converter circuit 500b may output a load current $I_{LOAD}$ with the same waveform as that of an inductor current $I_L$ flowing in the single inductor in a first time interval in which the inductor current $I_L$ is ramped up and a second time interval in which the inductor current $I_L$ is ramped down during the step-up mode. Since the inductor current $I_L$ and the load current $I_{LOAD}$ have the same waveform, power efficiency may increase. However, since a load current $I_{LOAD}$ is absent in an interval in which an inductor current $I_L$ increases in the buck-boost circuit 500a, the buck-boost circuit 500a may discontinuously supply the load current $I_{LOAD}$, which may lead to a reduction in the power efficiency.

Also, in FIG. 5B, the voltage converter circuit 500b is implemented with multiple outputs, and accordingly, an output switch is connected for each output terminal. However, an output switch is not needed for a single output. On the contrary, the buck-boost circuit 500a of FIG. 5A needs an output switch even for a single output. For example, when the voltage converter circuit 500b is implemented with a single output, a number of switches included in a power path of the voltage converter circuit 500b may be less than a number of switches included in a power path of the buck-boost circuit 500a. Thus, the voltage converter circuit 500b implemented with a single output may have a low transmission loss compared to the buck-boost circuit 500a.

Figure 6:
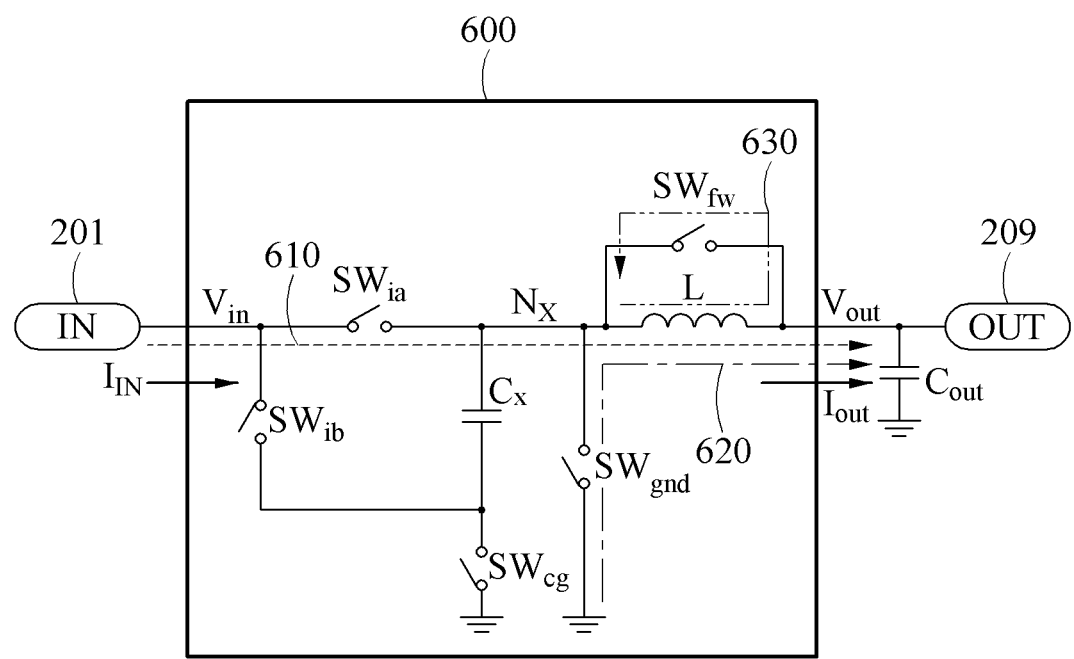
FIGS. 6 and 7 illustrate examples of operations of a voltage converter circuit with a discontinuous current mode (DCM) in a step-down mode.
Figure 7:
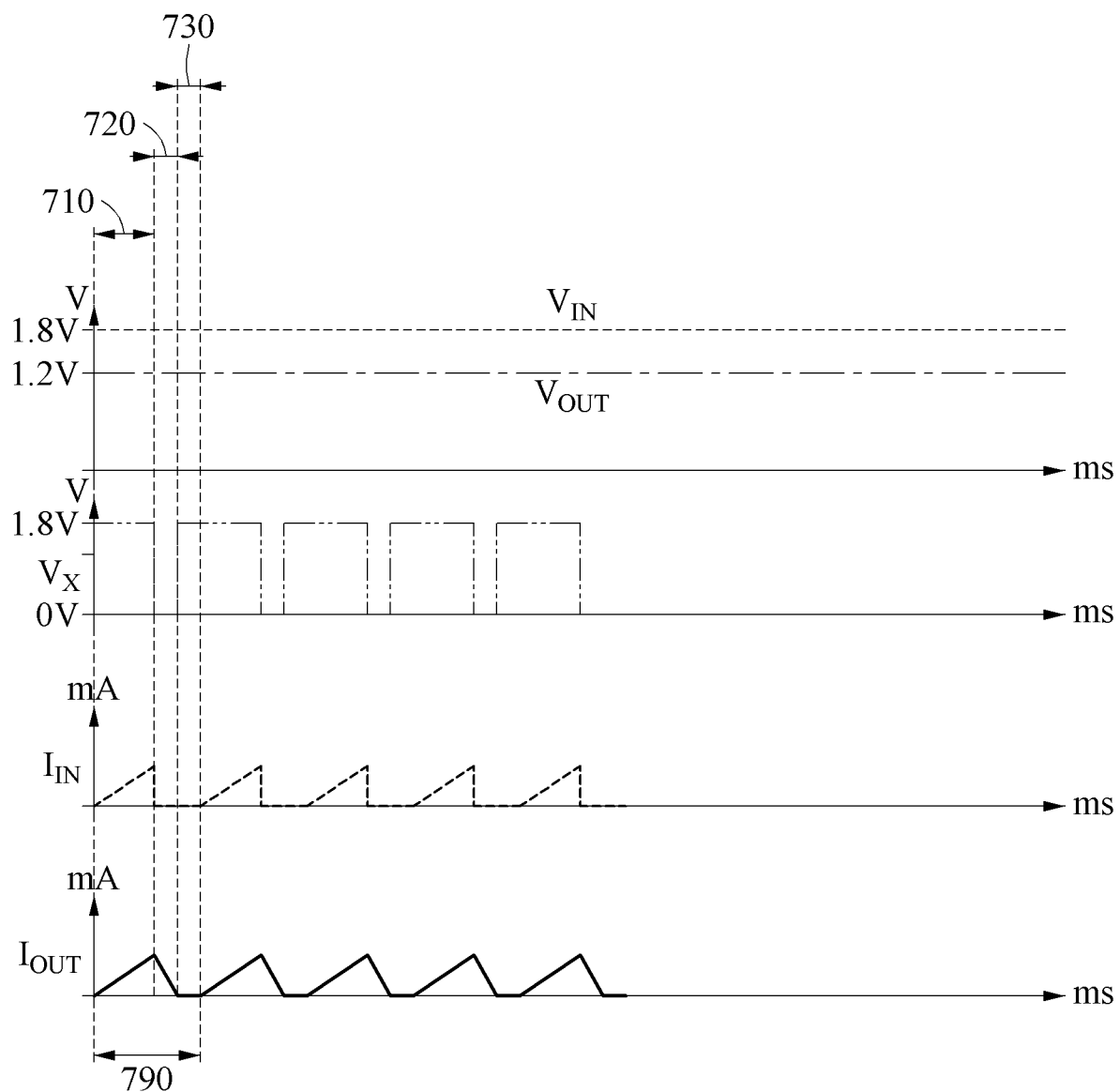

FIGS. 6 and 7 illustrate examples of operations of a voltage converter circuit 600 with a discontinuous current mode (DCM) in a step-down mode.

Referring to FIG. 6, the voltage converter circuit 600 may be configured with the DCM and may further include a freewheeling path 630, including a freewheeling switch $SW_{fw}$ in addition to the structure of FIG. 2. FIG. 7 is a timing diagram illustrating operations of the voltage converter circuit 600 configured with the DCM in the step-down mode. The voltage converter circuit 600 may sequentially repeatedly perform operations of a first time interval 710, a second time interval 720, and a third time interval 730 for each cycle 790 in the step-down mode. However, examples are not limited to the freewheeling path 630 of FIG. 6 and a freewheeling path 830 of FIG. 8. The freewheeling path 630 may include various electric paths configured to short a single inductor L in a portion of time intervals.

Similar to the above description, the voltage converter circuit 600 may generate an output voltage $V_{OUT}$ by supplying an input voltage $V_{IN}$ to the single inductor L while activating a first step-down power path 610. During the first time interval 710 of the cycle 790, a node voltage $V_x$ may increase up to the input voltage $V_{IN}$.

Additionally, the voltage converter circuit 600 may supply a ground voltage to the single inductor L while activating a second step-down power path 620. During the second time interval 720 of the cycle 790, the node voltage $V_x$ may drop to a ground voltage of 0 V. In this example, an input current $I_{IN}$ may increase during the first time interval 710 and may be blocked during the other time intervals. An output current $I_{OUT}$ may be generated with the same waveform as that of an inductor current during the first time interval 710 and the second time interval 720.

The voltage converter circuit 600 may activate the freewheeling path 630 during the third time interval 730 of the cycle 790. For example, the voltage converter circuit 600 may short both ends of the single inductor L by turning on the freewheeling switch $SW_{fw}$. In this example, a first input switch $SW_{ia}$ may also be activated, and the node voltage $V_x$ may be maintained to be equal to the input voltage $V_{IN}$.

Even in a DCM configuration, the duty ratio may be determined as "D=(first time interval 710/(first time interval 710+second time interval 720))." In the step-down mode, the output voltage $V_{OUT}$ equal to $D \cdot V_{IN}$ may be output.

In FIGS. 6 and 7, an average $I_{IN\_AVG}$ of the input current $I_{IN}$ may be 43.57 milliamperes (mA), an average $I_{OUT\_AVG}$ of the output current $I_{OUT}$ may be 59.88 mA, and power efficiency may be 92%. The power efficiency may be calculated as a ratio $P_{OUT}/P_{IN}$ of output power $P_{OUT}$ to input power $P_{IN}$.

Figure 8:
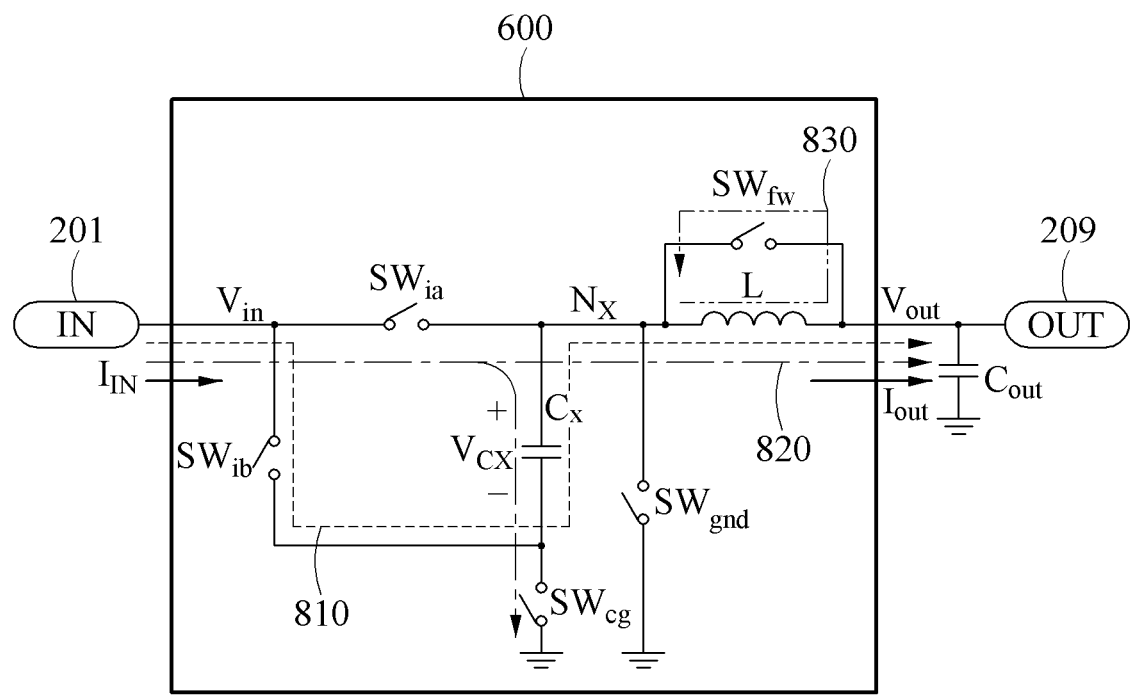
FIGS. 8 and 9 illustrate examples of operations of a voltage converter circuit with a DCM in a step-up mode.
Figure 9:
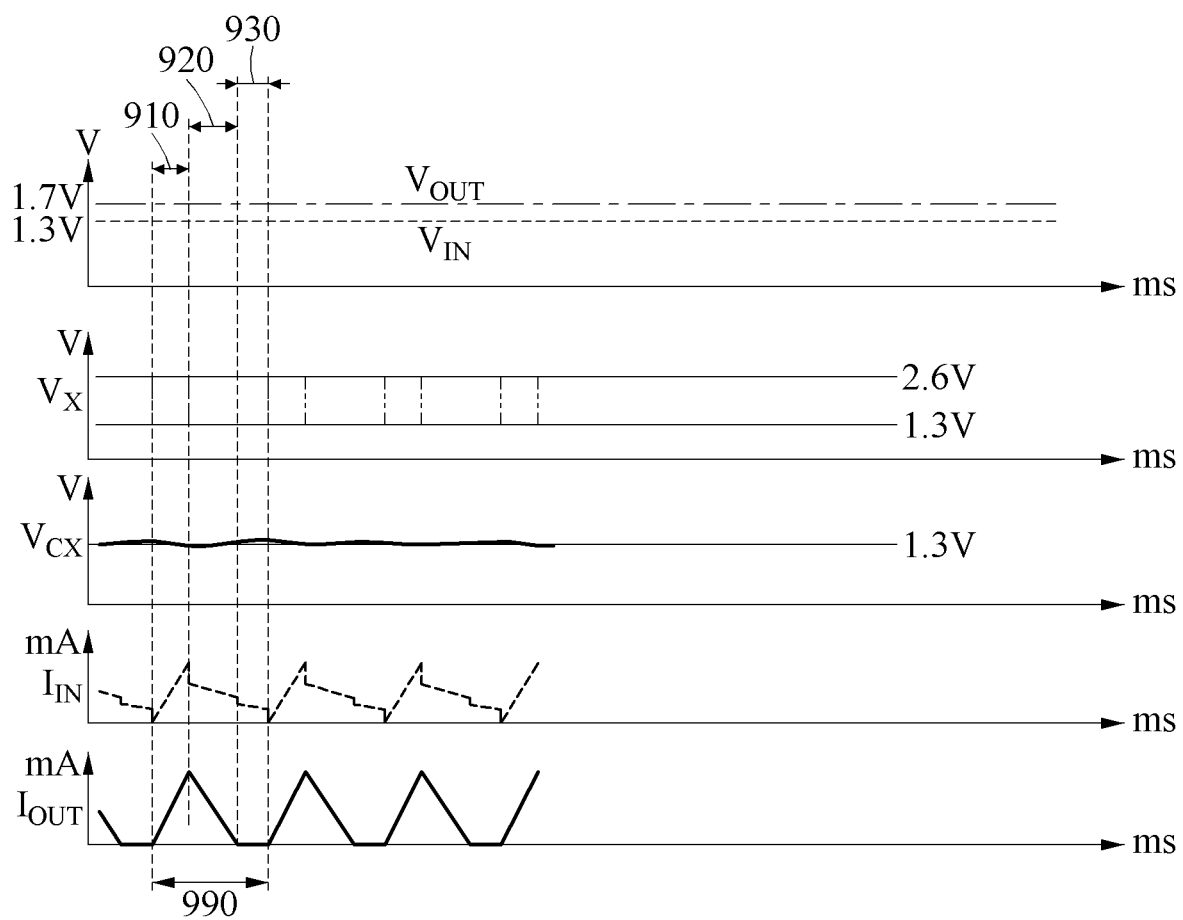

FIGS. 8 and 9 illustrate examples of operations of a voltage converter circuit 600 with a DCM in a step-up mode.

An operation of the voltage converter circuit 600 in the step-up mode is described with reference to FIG. 8. FIG. 9 is a timing diagram illustrating operations of the voltage converter circuit 600 in the step-up mode. The voltage converter circuit 600 may sequentially repeatedly perform operations of a first time interval 910, a second time interval 920, and a third time interval 930 for each cycle 990 in the step-up mode.

Similar to the above description, the voltage converter circuit 600 may generate an output voltage $V_{OUT}$ by supplying a voltage obtained by adding an input voltage $V_{IN}$ and a charging voltage $V_{cx}$ to a single inductor L while activating a first step-up power path 810. The charging voltage $V_{cx}$ equal to the input voltage $V_{IN}$ may be used for charging, and accordingly, a node voltage $V_x$ may increase up to $2V_{IN}$ during the first time interval 910 of the cycle 990. In an example, the input voltage $V_{IN}$ may be 1.3 V, the output voltage $V_{OUT}$ may be 1.7 V, and the node voltage $V_x$ may increase up to 2.6 V during the first time interval 910.

The voltage converter circuit 600 may also supply the input voltage $V_{IN}$ to the single inductor L while activating a second step-up power path 820. The node voltage $V_x$ may drop to the input voltage $V_{IN}$ during the second time interval 920 of the cycle 990. In FIG. 9, the node voltage $V_x$ may drop to 1.3 V during the second time interval 920. Simultaneously, the voltage converter circuit 600 may charge a capacitor $C_x$ with the input voltage $V_{IN}$ during the second time interval 920. For example, when the capacitor $C_x$ has a capacitance greater than or equal to a threshold capacitance, the charging voltage $V_{cx}$ may slowly decrease during the first time interval 910, and the charging voltage $V_{cx}$ may be restored up to the input voltage $V_{IN}$ during the second time interval 920. Thus, a charge balance of the capacitor $C_x$ may be maintained in each cycle 990. The capacitor $C_x$ may be disconnected from a ground terminal during time intervals other than the second time interval 920 in each cycle 990.

An output current $I_{OUT}$ may be generated with the same waveform as that of an inductor current during the first time interval 910 and the second time interval 920. Thus, the single inductor L may continue to supply a load current to an output terminal 209 during the first time interval 910 and the second time interval 920.

Subsequently, the voltage converter circuit 600 may activate the freewheeling path 830 during the third time interval 930 of the cycle 990. For example, the voltage converter circuit 600 may short both ends of the single inductor L by turning on a freewheeling switch $SW_{fw}$. Similar to the above description, the node voltage $V_x$ may be maintained equal to the input voltage $V_{IN}$.

Even in a DCM configuration, the duty ratio may be determined as "D=(first time interval 910/(first time interval 910+second time interval 920))." In the step-up mode, the output voltage $V_{OUT}$ equal to $(1+D)V_{IN}$ may be output.

In FIGS. 8 and 9, an average $I_{IN\_AVG}$ of the input current $I_{IN}$ may be 89.29 mA, an average $I_{OUT\_AVG}$ of the output current $I_{OUT}$ may be 59.23 mA, and power efficiency may be 91%.

Figure 10:
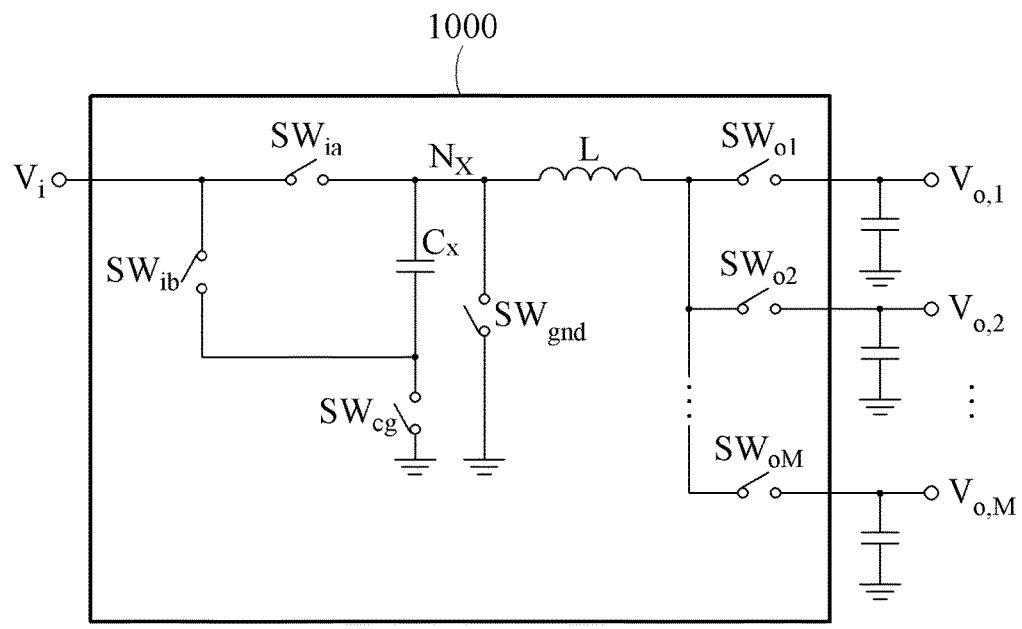
FIG. 10 illustrates an example of a voltage converter circuit with multiple outputs.

FIG. 10 illustrates an example of a voltage converter circuit 1000 with multiple outputs.

The voltage converter circuit 1000 of FIG. 10 may be configured by adding a plurality of output terminals connected to the single inductor L to the voltage converter circuit 200 of FIG. 2. For example, the plurality of output terminals may include output terminals $V_{o,1}$, $V_{o,2}$, and $V_{o,M}$. For example, each of a plurality of output switches, for example, the output switches $SW_{o1}$, $SW_{o2}$, and $SW_{oM}$, may selectively connect the single inductor L to a corresponding output terminal. In this example, M may be an integer greater than or equal to "2."

The voltage converter circuit 1000 may select one output terminal from the plurality of output terminals. It may supply an output voltage generated by the single inductor L to the selected output terminal. The voltage converter circuit 1000 may supply one of a voltage, according to a step-down operation, and a voltage, according to a step-up operation, to the selected output terminal.

The voltage converter circuit 1000 may also maintain a connection between the selected output terminal and the single inductor L, until the selected output terminal is changed to another output terminal. In other words, switching between the single inductor L and an output terminal for the step-down operation and the step-up operation may be unnecessary. Thus, the voltage converter circuit 1000 may seamlessly continue to provide a load current to the selected output terminal.

Figure 11:
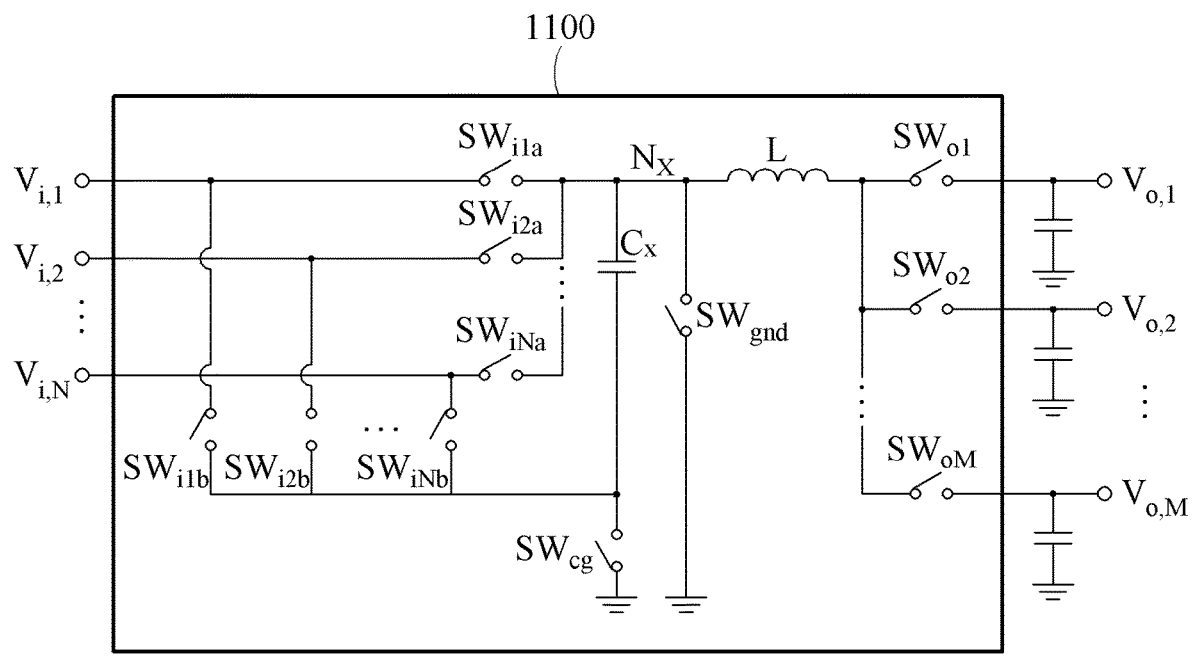
FIG. 11 illustrates an example of a voltage converter circuit with multiple inputs and multiple outputs.

FIG. 11 illustrates an example of a voltage converter circuit 1100 with multiple inputs and multiple outputs.

The voltage converter circuit 1100 of FIG. 11 may be configured by adding a plurality of input switches to the voltage converter circuit 1000 of FIG. 10. The voltage converter circuit 1100 may include a plurality of first input switches, for example, first input switches $SW_{i1a}$, $SW_{i2a}$, and $SW_{iNa}$, and a plurality of second input switches, for example, second input switches $SW_{i1b}$, $SW_{i2b}$, and $SW_{iNb}$. For each of "N" input power sources, for example, input power sources $V_{i,1}$, $V_{i,2}$, and $V_{i,n}$, a corresponding first input switch, and a corresponding second input switch may be connected to both ends of a capacitor $C_x$. In this example, N may be an integer greater than or equal to "2."

The plurality of first input switches $SW_{i1a}$ through $SW_{iNa}$ may selectively connect each of the plurality of input power sources through to a first end of the capacitor $C_x$. The plurality of second input switches $SW_{i1b}$ through $SW_{iNb}$ may selectively connect each of the plurality of input power sources $V_{i,1}$ through $V_{i,n}$ to a second end of the capacitor $C_x$. The voltage converter circuit 1100 may generate an output voltage by stepping up or down a voltage received from one of the plurality of input power sources $V_{i,1}$ through $V_{i,n}$, and may supply the generated output voltage to one of the plurality of output terminals $V_{o,1}$ through $V_{o,M}$.

Figure 12:
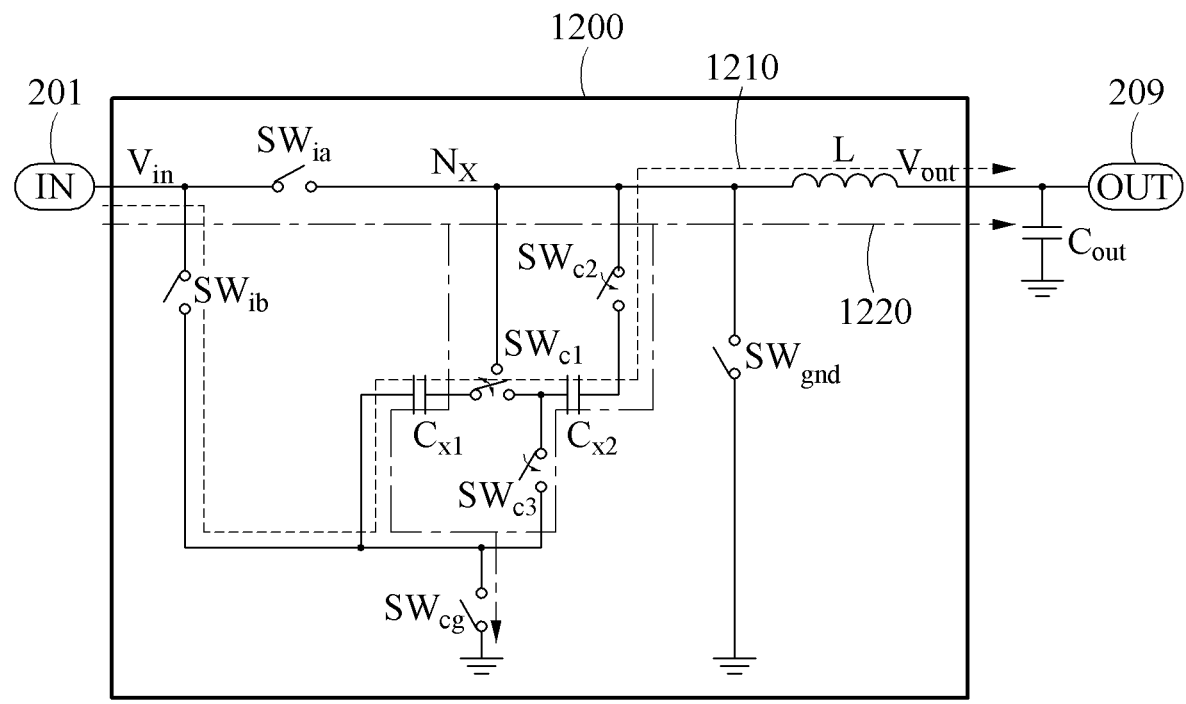
FIG. 12 illustrates an example of an operation of a voltage converter circuit with an extended transformation ratio in a step-up mode.

FIG. 12 illustrates an example of an operation of a voltage converter circuit 1200 with an extended transformation ratio in a step-up mode.

The voltage converter circuit 1200 of FIG. 12 may be configured by adding an additional capacitor $C_{x2}$ to the voltage converter circuit 200 of FIG. 2. For example, the voltage converter circuit 1200 may further include at least one additional capacitor $C_{x2}$ configured to establish one of a parallel connection and a series connection with a capacitor $C_{x1}$ through a plurality of additional switches. The operation of the voltage converter circuit 1200 in the step-down mode is the same as that described above with reference to FIG. 3, and accordingly, further description thereof is not repeated herein.

The voltage converter circuit 1200 may charge the capacitor $C_{x1}$ and the additional capacitor $C_{x2}$ while activating a second step-up power path 1220. For example, the voltage converter circuit 1200 may charge the capacitor $C_{x1}$ and at least one additional capacitor $C_{x2}$ connected in parallel during a second time interval of the step-up mode, using an input power source.

The voltage converter circuit 1200 may generate an output voltage using the capacitor $C_{x1}$ and the additional capacitor $C_{x2}$ while activating a first step-up power path 1210. For example, the voltage converter circuit 1200 may add an input voltage and charging voltages used to charge the capacitor $C_{x1}$ and at least one additional capacitor $C_{x2}$ that are connected in series during a first time interval of the step-up mode, and may transfer a voltage, obtained by adding the charging voltages and the input voltage, to a single inductor L. In the example of FIG. 12, since each of the capacitor $C_{x1}$ and the additional capacitor $C_{x2}$ is charged with an input voltage $V_{in}$, a node voltage $V_x$ may increase up to $3V_{in}$. This is because the input terminal 201, the capacitor $C_{x1}$, and the additional capacitor $C_{x2}$ are connected in series. Thus, the voltage converter circuit 1200 may output a voltage higher than or equal to the input voltage and lower than or equal to three times the input voltage based on a duty ratio D in the step-up mode.

Although one additional capacitor $C_{x2}$ is illustrated in FIG. 12 for the convenience of description, examples are not limited thereto. A number of capacitors stacked may be determined based on a voltage to be output. For example, the voltage converter circuit 1200 may include the capacitor $C_{x1}$, "K" additional capacitors, and switches that are configured to connect all the capacitor $C_{x1}$ and "K" additional capacitors in series in the first time interval and to connect all the capacitor $C_{x1}$ and "K" additional capacitors in parallel in the second time interval, where "K" is a natural number. The voltage converter circuit 1200 may output a voltage higher than or equal to the input voltage and lower than or equal to "(2+K)" times the input voltage in the step-up mode.

Figure 13:
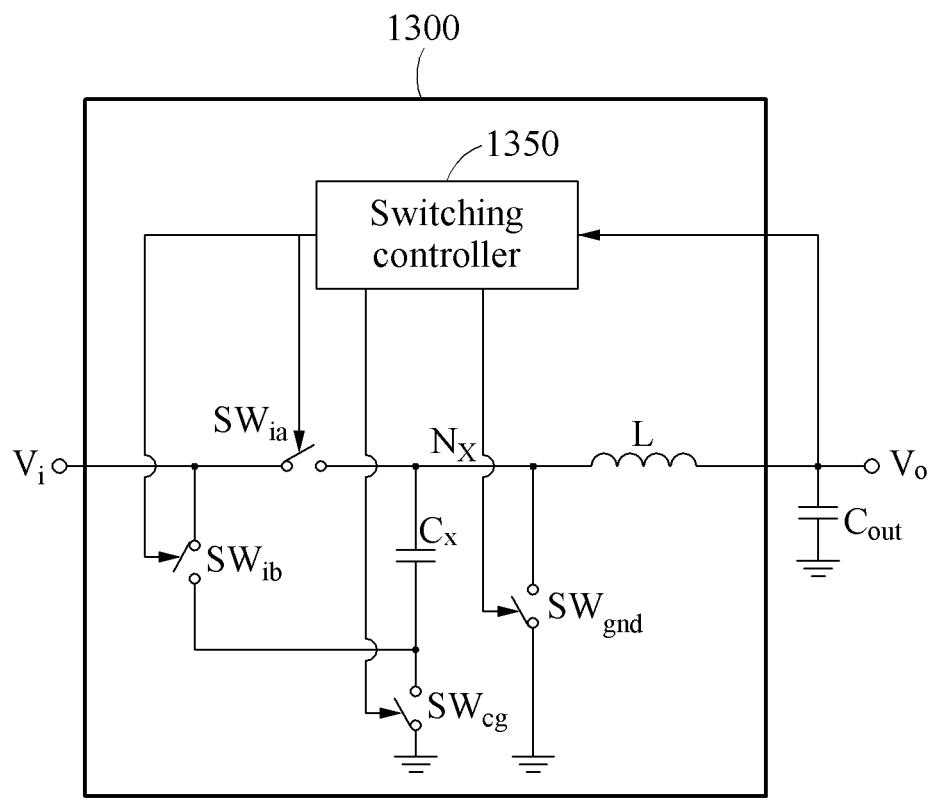
FIG. 13 illustrates an example of a configuration of a voltage conversion apparatus.

FIG. 13 illustrates an example of a configuration of a voltage conversion apparatus 1300.

Referring to FIG. 13, the voltage conversion apparatus 1300 includes the voltage converter circuit 200 of FIG. 2 and the switching controller 1350 configured to control switches of the voltage converter circuit 200.

The switching controller 1350 may control a switching timing of the switches of the voltage converter circuit 200. The switching controller 1350 may control turning on or off of each switch based on a time interval of a cycle for each of a step-down mode and a step-up mode. For example, the switching controller 1350 may control switching of the first input switch $SW_{ia}$, the second input switch $SW_{ib}$, the capacitor switch $SW_{cg}$, and the ground switch $SW_{gnd}$ for each of a first step-down power path, a second step-down power path, a first step-up power path, and a second step-up power path, as described above with reference to FIGS. 2 through 12. The switching controller 1350 may adjust a duty ratio for switching switches based on an output voltage and a set target voltage. The switching controller 1350 may be a negative feedback circuit, and may control, for example, switching of each switch in a first time interval and a second time interval based on a duty ratio determined based on a difference between the output voltage and the target voltage.

Figure 14:
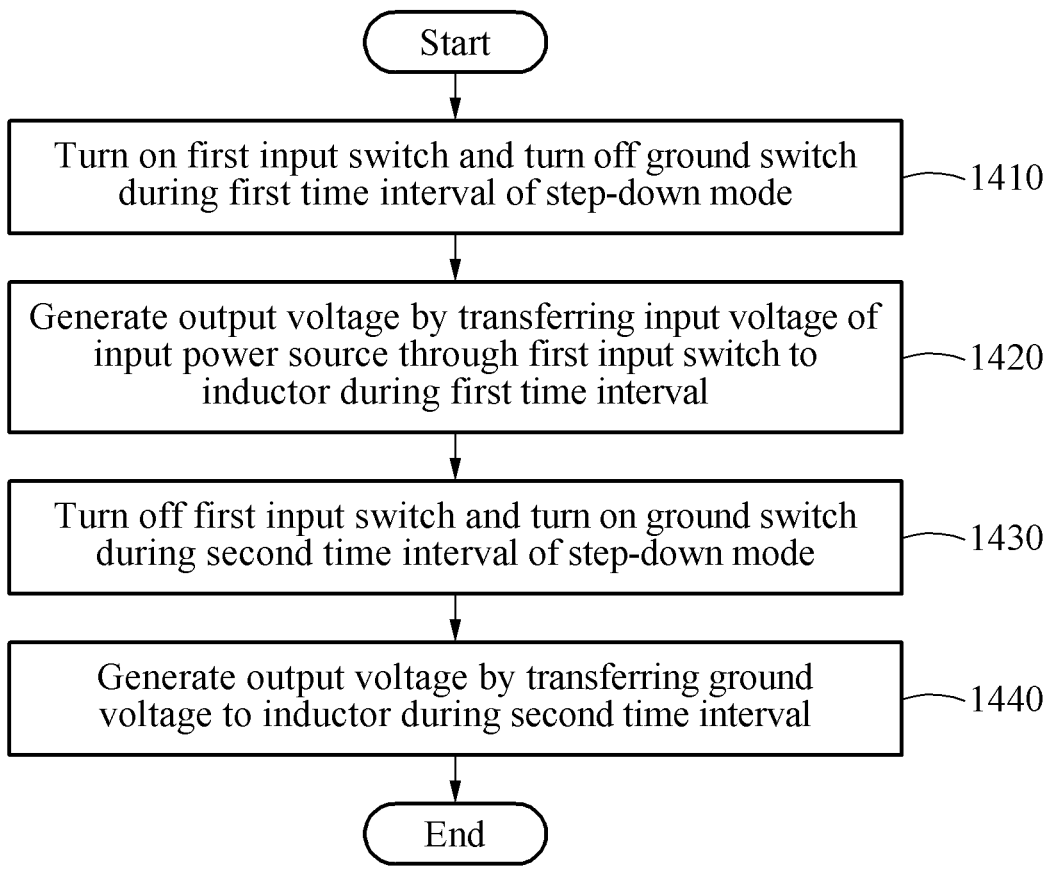
FIGS. 14 and 15 illustrate examples of voltage conversion methods.
Figure 15:
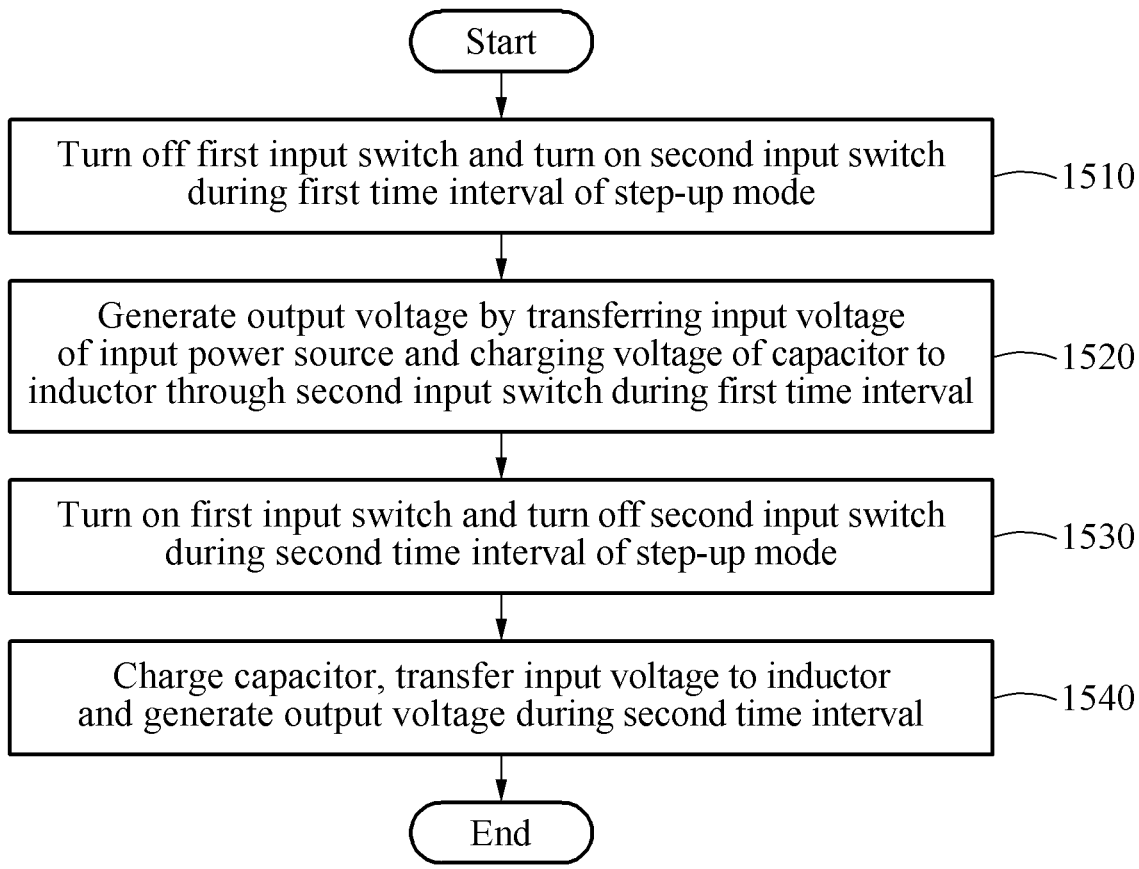

FIGS. 14 and 15 illustrate examples of voltage conversion methods.

FIG. 14 illustrates a voltage conversion method in a step-down mode.

Referring to FIG. 14, in operation 1410, a voltage converter circuit may turn on a first input switch and turn off a ground switch during a first time interval of the step-down mode.

In operation 1420, the voltage converter circuit may generate an output voltage by transferring an input voltage of an input power source through the first input switch to an inductor during the first time interval.

In operation 1430, the voltage converter circuit may turn off the first input switch and turn on the ground switch during a second time interval of the step-down mode.

In operation 1440, the voltage converter circuit may generate an output voltage by transferring a ground voltage to the inductor during the second time interval.

The voltage converter circuit may output a step-down voltage by repeatedly performing operations 1410 through 1440 every cycle. An operation of the voltage converter circuit in the step-down mode has been described above with reference to FIG. 3, and accordingly, further description thereof is not repeated herein.

FIG. 15 illustrates a voltage conversion method in a step-up mode.

Referring to FIG. 15, in operation 1510, a voltage converter circuit may turn off a first input switch between an input power source and an inductor and may turn on a second input switch between the input power source and a capacitor during a first time interval of the step-up mode.

In operation 1520, the voltage converter circuit may generate an output voltage by transferring an input voltage of the input power source and a charging voltage used to charge the capacitor to the inductor through the second input switch during the first time interval.

In operation 1530, the voltage converter circuit may turn on the first input switch and turn off the second input switch during a second time interval of the step-up mode.

In operation 1540, the voltage converter circuit may charge the capacitor, transfer the input voltage to the inductor, and generate an output voltage during the second time interval.

The voltage converter circuit may output a step-up voltage by repeatedly performing operations 1510 through 1540 every cycle. An operation of the voltage converter circuit in the step-up mode has been described above with reference to FIG. 4, and accordingly, further description thereof is not repeated herein.

According to examples, a voltage converter circuit and a voltage conversion apparatus may require power charging or DC voltage regulation, and may be applied to various applications where multiple external passive elements are not available due to their relatively small volume conditions.

The switching controller 1350, apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-4 and 5B-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A voltage converter circuit, comprising:
    a capacitor having a first end selectively connected to an input power source through a first input switch and a second end selectively connected to the input power source through a second input switch;
    a single inductor configured to generate an output voltage in response to a voltage of a node connected between the single inductor and the first input switch; and
    a ground switch configured to selectively connect the single inductor to a ground at the node for a step-down mode of the voltage converter circuit,
    wherein the single inductor is selectively connected with the input power source through the first input switch, directly connected with the first end of the capacitor at the node, and connected to an output terminal of the voltage converter circuit.

2. The voltage converter circuit of claim 1, wherein, when the voltage converter circuit is operating in a step-up mode, the single inductor is configured to generate the output voltage by alternately receiving a voltage in a first step-up power path including the capacitor, and a voltage in a second step-up power path including the first input switch.

3. The voltage converter circuit of claim 1, wherein, in a step-up mode of the voltage converter circuit, the single inductor is configured to receive a voltage, higher than an input voltage of the input power source, from the capacitor at the node with the first input switch being open and the second input switch being closed.

4. The voltage converter circuit of claim 1, wherein, in a step-up mode of the voltage converter circuit, the capacitor is configured to transfer a voltage, obtained by adding a voltage of the capacitor to an input voltage of the input power source, to the single inductor with the first input switch being open and the second input switch being closed.

5. The voltage converter circuit of claim 1, wherein, in a step-up mode of the voltage converter circuit, the single inductor is configured to receive an input voltage of the input power source, through the first input switch, at the node with the first input switch being closed and the second input switch being open.

6. The voltage converter circuit of claim 1, further comprising:
    a capacitor switch configured to selectively connect the second end of the capacitor to a ground,
    wherein, in a step-up mode of the voltage converter circuit, the capacitor switch is configured to charge the capacitor using the input power source by connecting the second end of the capacitor to the ground with the first input switch being closed and the second input switch being open.

7. The voltage converter circuit of claim 1, wherein, in a step-up mode of the voltage converter circuit, the voltage converter circuit is configured to generate the output voltage with a voltage value within a range of voltages higher than or equal to an input voltage of the input power source and lower than or equal to twice the input voltage.

8. The voltage converter circuit of claim 1,
    wherein the voltage converter circuit is configured to maintain an open state of the ground switch during a step-up mode of the voltage converter circuit, and to maintain an open state of a capacitor switch, selectively connecting the second end of the capacitor to the ground, and the second input switch during the step-down mode.

9. The voltage converter circuit of claim 8, wherein, when the voltage converter circuit is operating in the step-down mode, the single inductor is configured to generate the output voltage by alternately receiving a voltage in a first step-down power path including the first input switch, and a voltage in a second step-down power path including the ground switch.

10. The voltage converter circuit of claim 8, wherein, in the step-down mode, the single inductor is further configured to receive an input voltage of the input power source at the node with the first input switch being closed and the ground switch being open.

11. The voltage converter circuit of claim 8, wherein, in the step-down mode, the single inductor is further configured to receive a ground voltage at the node with the first input switch being open and the ground switch being closed.

12. The voltage converter circuit of claim 1, wherein, in a step-up mode of the voltage converter circuit, the single inductor is configured to output a load current with a waveform same as a waveform of an inductor current flowing in the single inductor in a first time interval, in which the inductor current is ramped up, and a second time interval in which the inductor current is ramped down.

13. The voltage converter circuit of claim 1, further comprising:
    a plurality of output terminals, including the output terminal, selectively connected to the single inductor,
    wherein the voltage converter circuit is configured to select one of the output terminals, and connect the output voltage generated by the single inductor to the selected output terminal.

14. The voltage converter circuit of claim 1, further comprising:
    a plurality of first input switches, including the first input switch, configured to selectively respectively connect each of a plurality of input power sources to the first end of the capacitor; and
    a plurality of second input switches, including the second input switch, configured to selectively respectively connect each of the plurality of input power sources to the second end of the capacitor.

15. The voltage converter circuit of claim 1, further comprising:
at least one additional capacitor configured to establish one of a parallel connection with the capacitor and a series connection with the capacitor through a plurality of additional switches,
wherein the voltage converter circuit is configured to charge the capacitor and the at least one additional capacitor that are connected in parallel during a second time interval of a step-up mode of the voltage converter circuit, using the input power source, and
wherein the voltage converter circuit is configured to add an input voltage of the input power source and charged voltage of the capacitor and the at least one additional capacitor in the selected series connection during a first time interval of plural intervals of the step-up mode, and transfer a voltage, resulting from the adding, to the single inductor.

16. The voltage converter circuit of claim 1, further comprising:
a switching controller configured to adjust a duty ratio for the first input switch and the second input switch based on a set target voltage and the output voltage.

17. The voltage converter circuit of claim 1, wherein
each of a plurality of first input switches is configured to selectively connect an external power source terminal and a battery power source terminal to the first end of the capacitor,
each of a plurality of second input switches is configured to selectively connect the external power source terminal and the battery power source terminal to the second end of the capacitor, and
the single inductor is selectively connected to one of the battery power source terminal, a first output terminal, and a second output terminal.

18. A voltage conversion method, comprising:
during a first time interval of a step-up mode of the voltage converter circuit, turning off a first input switch between an input power source and an inductor, and turning on a second input switch between the input power source and a capacitor;
generating, during the first time interval, an output voltage by transferring an input voltage of the input power source and a charging voltage used to charge the capacitor through the second input switch to the single inductor;
turning on the first input switch and turning off the second input switch during a second time interval of the step-up mode;
charging the capacitor, transferring the input voltage to the single inductor, and generating an output voltage during the second time interval;
during a first time interval of a step-down mode of the voltage converter circuit, turning off the first input switch, and turning off a ground switch which selectively connect the single inductor to a ground at the node; and
turning off the first input switch and turning on the ground switch during a second time interval of the step-down mode,
wherein the inductor, connected to an output terminal, is configured to directly connect a first end of the capacitor to a node between the inductor and the first input switch.

19. A voltage converter circuit, comprising:
a capacitor having a first end selectively connected to each of input power sources through corresponding ones of first input switches, and a second end selectively connected to the input power sources through corresponding ones of second input switches;
an inductor, connected to an output terminal, configured to generate output voltages in response to a voltage of a node between the inductor and the first input switches, selectively connect the input power sources through corresponding ones of the first input switches at the node, and directly connect the first end of the capacitor at the node; and
a ground switch configured to selectively connect the single inductor to a ground at the node in a step-down mode of the voltage converter circuit.

20. The voltage converter circuit of claim 19, wherein, when the voltage converter circuit is operating in a step-up mode of the voltage converter circuit, the inductor is further configured to generate the output voltages by alternately receiving each of voltages in first step-up power paths including the capacitor, and voltages in second step-up power paths including the first input switch.

21. The voltage converter circuit of claim 19, wherein, in a step-up mode of the voltage converter circuit, the single inductor is further configured to receive a voltage higher than an input voltage of a corresponding one of the input power sources from the capacitor at the node with a corresponding one of the first input switches being open and a corresponding one of the second input switches being closed.

22. The voltage converter circuit of claim 19, wherein, in a step-up mode of the voltage converter circuit, the capacitor is configured to transfer a voltage, obtained by adding a charging voltage used to charge the capacitor to an input voltage of one of the input power sources, to the inductor with a corresponding one the first input switches being open and a corresponding one of the second input switch being closed.

23. The voltage converter circuit of claim 19, wherein, in a step-up mode of the voltage converter circuit, the inductor is further configured to receive an input voltage of the input power sources through a corresponding one of the first input switches at the node with a corresponding one of the first input switches being closed and a corresponding one of the second input switches being open.

24. The voltage converter circuit of claim 19, further comprising:
a capacitor switch configured to selectively connect the second end of the capacitor to the ground,
wherein, in a step-up mode of the voltage converter circuit, the capacitor switch is further configured to charge the capacitor using one of the input power sources by connecting the second end of the capacitor to the ground with the first input switch being closed and the second input switch being open.

25. The voltage converter circuit of claim 19, further comprising:
wherein the voltage converter circuit is configured to maintain an open state of the ground switch during a step-up mode of the voltage converter circuit, and maintain an open state of a capacitor switch and the second input switches during the step-down mode.

* * * * *